June 1, 1965 H. J. SAMUEL 3,186,208
MULTI-CONTAINER PRESSES
Filed March 30, 1962 2 Sheets-Sheet 1
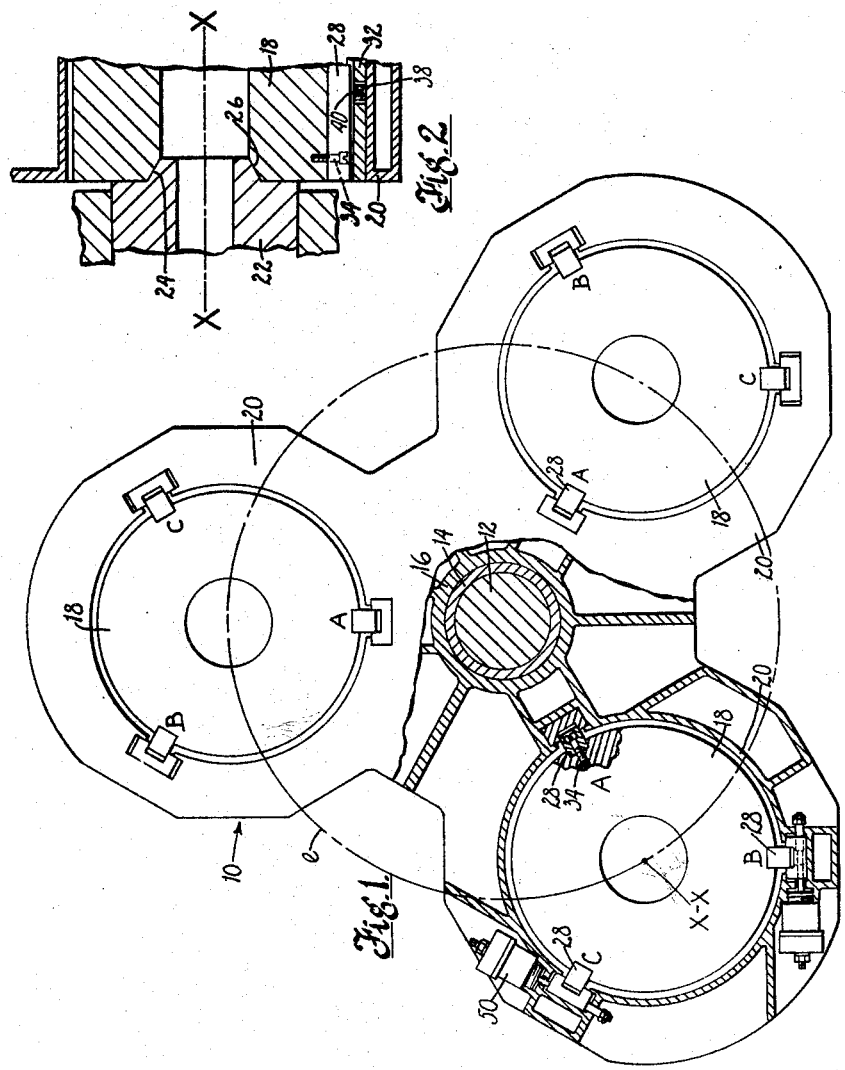
INVENTOR
HERBERT JOHN SAMUEL
BY
Hammond and Littell
ATTORNEYS

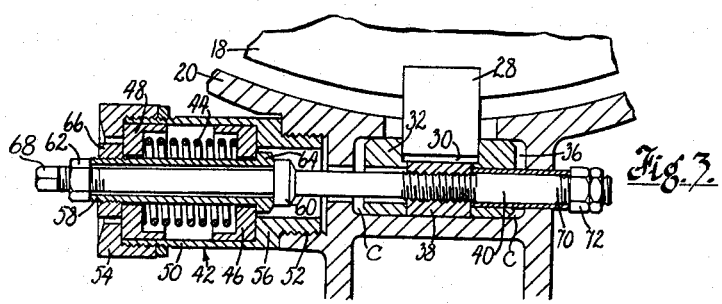
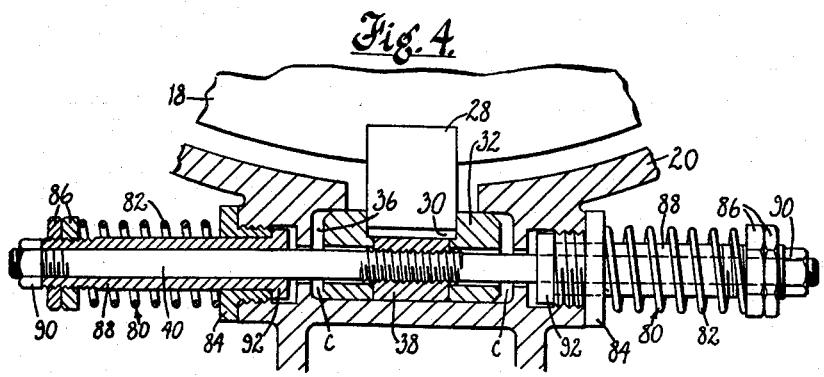
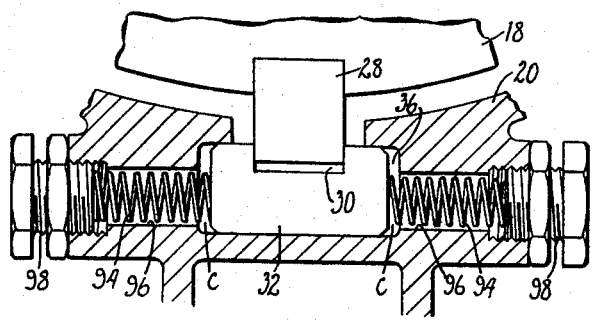

United States Patent Office 3,186,208
Patented June 1, 1965

3,186,208
MULTI-CONTAINER PRESSES
Herbert John Samuel, Northbourne, Bournemouth, England, assignor to The Loewy Engineering Company Limited, Bournemouth, England, a corporation of Great Britain
Filed Mar. 30, 1962, Ser. No. 183,953
4 Claims. (Cl. 72—263)

This invention relates to presses in which a pre-heated piece of metal, usually in the form of a circular billet, a square or rectangular ingot or any other configuration having a central axis is operated upon by one or more press tools arranged and movable in this axis. The operation performed in the press may consist, for instance, of extruding, forging or any other hot-working operation. Generally in presses used for this kind of work, the workpiece is held in a container during the operation, the container being supported in a housing which in turn is supported on the press frame.

In order to ensure trouble-free operation of the press and to avoid defects in the pressed products, the container must always be kept in axial alignment with the press tool or tools. Thus, in presses in which billets are extruded from a container by a pressing stem through a die placed at the end of the container, special care must be taken that the container, die and pressing stem remain in exact alignment with each other during the operation. In presses for the extrusion of hollow articles such as tubes, a mandrel is provided in the press axis, and, here again, constant axial alignment between container and mandrel is essential.

The containers of presses which are operated with a succession of pre-heated workpieces as well as the housings for these containers are apt to attain elevated temperatures and therefore to expand. Provision must consequently be made in these presses for the containers and their housings to be kept in axial alignment with the other parts of the press, irrespective of thermal expansion. To this end, it is the practice to support the container in the housing by means of ribs which can slide radially in grooves formed in the housing and situated in planes passing through the container axis. Axial alignment between the container housing and the other parts of the press, irrespective of thermal expansion of the housing, is achieved by supporting the housing slidingly on surfaces provided on the press frame and situated in planes passing through the container axis.

Nowadays presses have come to the fore in which the container housing is in the form of a rotary carrier or wheel rotatable about an axis parallel to the press axis. This arrangement is particularly suitable for presses having a plurality of containers. The containers are then mounted in the same carrier on a circle about the latter's axis of rotation, the circle passing through the axis of the other press tools. By turning the carrier, the containers are moved one by one into a position in which they are in alignment with the tool axis, i.e., in the working zone of the press, while the other container or containers are outside. Thus, while an operation is in progress at one container, the other container or containers are at an outside station where they can be prepared for the next operation. Multi-container presses having a rotary container carrier have thus the important advantage that they allow a considerable increase of press operations per hour and thereby the output of the press.

During the operation of the press, the entire structure, including containers, their housings and the carrier, become hot and accordingly expand. While there is a temperature gradient between container and its housing and again between the housing and the carrier, the average temperature in the structure is high enough to produce considerable thermal expansion, chiefly in radial directions away from the axis of rotation of the carrier. This expansion leads to misalignment between the container which is in the working zone and the other press tools, unless special provision is made to prevent it. It is evident that in the case of a rotary carrier arranged in the manner described, the conventional manner of supporting the container housing on the press frame is not practicable.

It is an object of the present invention to provide, in a press having a rotary container carrier, means for mounting a container in such a manner in the housing provided in the carrier that the position of the container relative to the press axis is not affected by any expansion of the housing or carrier.

In the press according to the invention, a container carrier is rotatable about an axis parallel to the tool axis, a housing being provided on said carrier for at least one container, the container being supported in the housing by means of ribs which can slide radially in grooves formed in the housing and situated in planes passing through the container axis.

The novelty of the invention is seen in the first place in that in a press as described in the preceding paragraph, supports provided between a container and its housing are capable of a sliding movement in planes at right angles to the radial planes of the container which pass through the mid-points of the respective supports.

The supports of the container can therefore move in two directions at right angles to each other, of which one is radial and the other tangential with respect to the circular outside of the container. This makes it possible for a container and its housing to move relative to each other in any direction relative to the container axis, and the container will retain its axial alignment with the other press tools, irrespective of any thermal expansion of the carrier in whatever direction.

The tangential movement of the container supports can be limited to an amount sufficient to allow the maximum thermal expansion of carrier and housing which can be expected under normal operating conditions of the press. Stops may be provided to limit the relative tangential movement between housing and container. Means may be further provided for yieldingly resisting displacement between a container and its housing, so that normally the support of a container is held in a mid-position relative to its housing by these yielding means.

In order to align the container which is in the working position with the other press tools, special centering means are provided. These means may consist of matching conical surfaces on container and die respectively which are held in sealing contact with each other after a container has been moved into the working position by relative movement of container and die in the press axis. In order to ensure a perfect seal, high pressure has to be maintained between container and die. This pressure is sufficient to ensure also that the container will remain centered on the die and thereby aligned with the tool axis.

The provision of matching conical surfaces on a container and a die respectively which are kept in sealing contact with each other under high pressure is known in presses of the type under consideration. Alternatively, other means may be provided for keeping a container which is in the working position aligned with the tool axis. Either the entire carrier or each individual container may be displaceable in the direction of the tool axis.

According to a further feature of the present invention, a support of a container in its housing includes a block in which a groove is formed into which a radially projecting rib of a container enters with radial clearance. Alternatively, the rib may be formed on the block and the groove in the container. The block is displaceable in the housing tangentially with respect to the circular outside of the container. Displacement of the block may be yieldingly resisted by spring- or fluid-pressure.

Generally, it will be sufficient to support the container in the manner described at three or four points of its circumference. One or more of these supports may be arranged in that radial plane of the container which passes also through the axis of rotation of the carrier. Such a support does not have to be movable in a tangential direction relative to the container outside, because the expansion of the housing which occurs at this support will be mainly in the radial direction of the container and can therefore be taken care of by the radial clearance in the grooves of this support.

Several embodiments of the invention as applied to an extrusion press will now be described by way of example with reference to the accompanying drawings, in which:

FIG. 1 is an end view, partly in section, of a container carrier of an extrusion press with its containers.

FIG. 2 is a longitudinal section through the die and the end of a container which is in the working position.

FIG. 3 is a section on a larger scale through one of the supports of a container of FIG. 1 and the adjacent part of its housing.

FIGS. 4 and 5 are similar sections of alternative embodiments of a container support.

Only those parts of the press are shown in the drawings which are necessary for the description of the invention, it being understood that the other parts of the press may be of any well-known design.

As shown in FIG. 1, a carrier 10, substantially in the shape of a three leafed clover is rotatable about one of the columns 12 of the press. The carrier may be rotated by electric or hydraulic power through a gear drive not shown. A bearing sleeve 14 is interposed between the column and the hub 16 of the carrier.

Provided in the carrier 10 are three containers 18. These containers are supported in three housings 20 of the carrier in a manner presently to be described, each of the housings 20 encircling its container with radial clearance. The three containers are angularly spaced apart from each other by 120°. They are arranged on a circle c about the axis of rotation of the carrier 10, the circle passing also through the axis X—X of the press tools. Rotation of the carrier 10 by an angle of 120° will therefore cause the containers to be moved one by one in a working position in the tool axis X—X. The other containers are then at stations outside the working zone of the press where they can be prepared for further operations.

It will be understood that the press in which the container carrier is incorporated is provided as usual with a hydraulically operated pressing stem which can enter the bore of a container in the axis X—X so as to extrude a billet from the container through a die 22 shown in part in FIG. 2. The axis of pressing stem and die is referred to in the following as a tool axis X—X. Die 22 and container 18 can be moved relative to each other in the direction of the axis X—X under hydraulic pressure by means not shown so that matching conical surfaces 24 and 26 provided on die and container respectively are moved into sealing engagement with each other. At the same time the container is centered on the die. As high pressure is required to ensure perfect sealing, container and die will retain their axial alignment with each other against any outside disturbing forces, provided that the container is so supported in its housing that it is not dislodged from its position co-axial with the die by thermal expansion of the housing.

Each of the three containers 18 is supported in its respective housing 20 at three points A, B and C. The supports provided at these three points form together a set. Two sets of supports are preferably provided in respect of each container 18, one set at each end of the container. If desired additional sets may be provided between the ends of the container. In the example shown in FIG. 1 of the drawings, point A is situated in the plane of a radius of the container passing through the axis of rotation of the carrier 10 whilst the points B and C are spaced apart from A by 120° each.

Each of the supports of a container 18 provided at A, B or C comprises a rib 28 projecting radially from the circular outside of the container 20 and extending substantially along the length of the container. Each rib 28 enters a matching groove 30 in a block 32. The groove 30 has sufficient depth to allow some free radial expansion of the container 18 relative to the housing 20. The rib 28 is shown here as being made separate from the container 18 and fastened thereto by screws 34. Alternatively the rib 28 may be formed in one piece with the container 18. It is further possible to reverse the aforedescribed arrangement and to provide the groove 30 in the container 18 and the rib 28 on the block 32.

Each of the blocks 32 is received and seated in a recess 36 formed in a housing 18, there being a clearance c left between the ends of that block and the walls of its recess. Hence the block can slide in its recess in a tangential direction with respect to the circular outside of the container.

In the case of the supports provided at B and C a nut 38 is inserted into each block 32 and threaded on to a rod 40, the latter extends through the block with radial clearance and its axis is directed tangentially with respect to the outside of the container and hence coincides with the direction of relative displacement between block and housing. A rib 28, its associative block 32 and a rod 40 form thus together a unit which can slide relative to the housing 18 in a plane at right angles to the radial plane of the container 18 through the mid-point of the block 32.

Movement of such a unit relative to the housing 18 is resisted by yieldable means. In the embodiment shown in FIG. 3 of the drawings these means comprise a single spring assembly 42 for each of the supports at B and C. This assembly comprises essentially spring 44 encircling the rod 40 and abutting with its ends against two washers 46 and 48. The spring 44 and its washers are arranged in the interior of a casing 50 which is secured to the housing 20 by screw-threads 52. The casing 50 is closed by a screw-on cover 54. The washers 46 and 48 are urged by pressure of the spring 44 on to a shoulder 56 on the casing 50 and on to the inside of cover 54 respectively. That part of the rod which passes through the casing 50 and its cover 54 is encircled with radial clearance by a sleeve 58, held against axial displacement relative to the rod 40 by a collar 60 on the rod, and by a nut 62 threaded on to the end of the rod 40. A head 64 on the end of the sleeve 58 is at one side in engagement with the collar 60 and at the other side with the washer 46. The nut 66 threaded on the outer end of the sleeve 58 is screwed down into engagement with the washer 48. In assembling the afore-described parts and placing them into their respective positions, care is taken that the casing 50 is far enough screwed into the housing 20 for the washer 46 to contact the head 64 of the sleeve 58. The position of the rod 40 relative to the parts of the spring assembly can be adjusted by means of a spanner placed on the square end 68 of the rod 40. The latter is guided in the block 32 by a tube 70 held in position by nuts 72.

Normally the position of the block 32 relative to the housing 20 is so adjusted that the clearance c provided between the ends of the block and the walls of the recess 36 are equal, so that in other words the block is in a central position. This is the position which the parts have when the container 18 is at room temperature.

In the course of the operation of a press, each of the containers 18 is fed with a succession of billets at elevated temperatures so that the containers and also their housings 20 and the carrier 10 become hot and consequently expand. Even under normal working conditions of a press the thermal expansion of the carrier 10 may be relatively large and greater than the permissible tolerances within which articles have to be produced in the press. For instance, in the case of presses in which steel billets are extruded the billet temperature is in the order of 1200° C., and the temperature of the containers, the housings and the carrier are correspondingly high. Although there will be a drop of temperature in the direction away from the containers and towards the axis of rotation of the carrier, the average temperature of housings and carrier may well be in the order of several hundred degrees centigrade. Added to this has to be the fact that the carrier 10 in a press has to be of relatively large size, in order to accommodate the containers. Hence the radius of the circle which passes through the centres of the containers 18 may be in the order of several feet.

As stated before it is essential for the container 18 which is in the working position to remain axially aligned with the other press tools whilst extrusion is in progress. This is particularly important when tubes are extruded with the aid of a mandrel. A container which is in the working position is in sealing contact with a die 22 as shown in FIG. 2. The conical surface 24 on the die 22 and the conical seat 26 at the end of the container 18 are then in firm engagement with each other. The pressure required for a perfect seal between die and container is always large enough to ensure axial alignment between container and die so long as no disturbing forces dislodge the container.

Assuming that the carrier 10 and with it the housing 20 for the container 18 shown in FIG. 3 have expanded to the left in FIG. 3 under the influence of heat, then the casing 50 moves also to the left, thereby detaching the right hand washer 46 from the head 64 and compressing the spring 44, without however changing the positions of the left hand washer 48 and the sleeve 58 and the rod 40 relative to the block 32 and rib 28. Conversely if the housing 20 expands to the right in FIG. 3 then the left hand washer 48 is detached from the nut 62 and the spring 44 compresses in the opposite direction as before. Here again the positions of the sleeve 58 and the rod 40 relative to the block 32 and rib 28 remain unchanged. The container 18 will therefore not be dislodged from its axial position by the expansion of the housing 20 and the carrier 10 in whatever direction this expansion occurs. This applies so long as there is any clearance c left between block 32 and walls of the recess 36 in the housing 20. It will be understood that the clearance c is made at least as large as the maximum expansion of the housing 20 relative to the container 18 which can be expected under normal operational conditions.

In the case of the supports for the container provided at A spring assemblies 42 are not required in as much as the expansion of the housing 20 at the point A takes place mainly in the direction of the radial plane of the container through this point and can therefore be taken care of by the clearance provided at the bottom of the groove 30 for the rib 28.

It will be clear that the expansion of the carrier 10 and the housings 20 does not interfere with the transmission of the weight load of the container 18 to the housings, this load being transmitted from the ribs 28 to the blocks 32 and from there through the rods 40 and spring assemblies 42 to the housing, whatever the position of the block 32 in the recess 36.

Simplified embodiments of the invention are shown in FIGS. 4 and 5 of the drawings. In the case of both these embodiments, a container 18 has radially projecting ribs 28 of which only one is shown, each rib entering a groove 30 in a block 32, there being sufficient radial clearance between a rib and the bottom of the groove to allow radial expansion of the hot container. The block 32 is received and situated in a recess 36 of the housing 20 of the container a clearance c being left at both ends of the block. This clearance is made at least as large as the maximum thermal expansion which will occur between container 18 and housing 20 under normal conditions.

The embodiment shown in FIG. 4 resembles that of FIG. 3 also in that respect that a nut 38 is inserted into the block 32, the nut being threaded on to a rod 40 which passes with radial clearance the block 32. The rod 40 extends through the block in a direction which is tangential to the circular outside of the container and thus at right angles to the radially projecting rib.

Two separate spring assemblies 80 are provided at each side of the block 32 in order to offer resistance to the displacement of the block 32 in its recess 36 and maintain the block normally in a central position in this recess. Each of the assemblies 80 comprises a compression spring 82 encircling the rod 40 and abutting with one end against a washer 84 threaded at 86 onto the housing 20 of the container. The other end of the spring 82 abuts against one of two nuts 86. These nuts are threaded on to a sleeve 88 placed on the rod 40 and held against axial displacement thereon at one end by a nut 90 and at the other end by a flange 92 which is in engagement under the pressure of the spring 82 with the washer 84. Clearance is left between the flange 92 and an opposite wall of the housing 20.

The above-described support functions substantially in the same manner as the support described with respect to FIG. 3. Upon displacement to the left in FIG. 4 of the housing 20, the spring 82 of the left hand spring assembly 80 is compressed by the movement of the washer 84, without interference, however, with the position of the rod 40.

The right hand spring assembly remains unaffected in this case. Corresponding movements within the right hand spring assembly take place when the housing 20 expands to the right in FIG. 4. In either case, the rod 40, the block 32 and the rib 28 are not displaced tangentially with respect to the radial plane through the rib 28.

The arrangement of FIG. 5 is still more simplified, inasmuch as the rod 40 is omitted. Springs 94 act directly at both sides of the block 32, the springs being mounted in recesses 96 of the housing 20; the other ends of the springs abut against plugs 98 screwed into the housing 20.

In the case of FIG. 5, the housing 20 can move tangentially relative to the rib 28 either to the left or to the right in FIG. 3 without carrying with it the block 32 and the container 18.

The invention can be carried out in ways other than those described here. For instance, the spring assemblies and the springs can be replaced by fluid-pressure means operated with either liquid or air pressure, or the container may be held in axial alignment with the tool axis X—X by other means than the matching conical surfaces 24 and 26 shown in FIG. 2.

I claim:

1. A press having containers for receiving heated metal billets, carriers for said containers which are rotatable about an axis parallel to the axis of the containers, housings in said carriers which encircle said containers with radial clearance and means spaced about their circumference to support said containers in their housings, said supporting means comprising members which are radially displaceable relative to the containers and tangentially displaceable relative to said housings.

2. A press of claim 1 wherein the means supporting said containers in said housings comprises a member having radially extending guiding surfaces in contact with the container and cooperating with a tangentially extending guiding surface in contact with the said housing.

3. A press according to claim 1 having means which yieldably resist relative tangential movement between said housings and the press.

4. A press of claim 1 wherein the means to support the containers in their housings comprises blocks slidably guided in said housings on tangentially extending surfaces, rods extending from the said blocks in a direction tangential to said housings and means mounted on said rods which yieldably resist tangential movement between said housings and said blocks.

References Cited by the Examiner

UNITED STATES PATENTS

| 2,782,919 | 2/57 | Norman | 207—15 |
| 2,830,701 | 4/58 | Kent | 207—15 |

FOREIGN PATENTS

| 1,163,770 | 4/58 | France. |
| 1,233,403 | 5/60 | France. |

MICHAEL V. BRINDISI, *Primary Examiner.*

WILLIAM W. DYER, JR., *Examiner.*